(12) United States Patent
Ting-Shan

(10) Patent No.: US 6,424,748 B1
(45) Date of Patent: Jul. 23, 2002

(54) METHOD FOR INCREASING BIT NUMBER OF DIGITAL IMAGE SIGNALS GENERATED BY A SCANNER

(75) Inventor: Cheng Ting-Shan, Ping Tung Hsien (TW)

(73) Assignee: Mustek Systems Inc., Hsin-Chu (TW)

( * ) Notice: Subject to any disclaimer, the term of this patent is extended or adjusted under 35 U.S.C. 154(b) by 0 days.

(21) Appl. No.: 09/285,709

(22) Filed: Apr. 5, 1999

(51) Int. Cl.$^7$ .................................................. G06K 9/40
(52) U.S. Cl. ........................ 382/254; 382/272; 382/274; 358/461
(58) Field of Search .................................. 382/254, 270, 382/272, 274, 312; 358/455, 458, 461, 446

(56) References Cited

U.S. PATENT DOCUMENTS 5,644,409 A * 7/1997 Irie et al. ..................... 358/461
5,949,924 A * 9/1999 Noguchi et al. ............. 382/312

\* cited by examiner

Primary Examiner—Thomas D. Lee
(74) Attorney, Agent, or Firm—Winston Hsu

(57) ABSTRACT

The present invention provides a transforming method for increasing bit number of digital image signals generated by a scanner. The scanner comprises a scanning module having a plurality of linearly arranged sensors for scanning a document and generating a plurality of corresponding analog image signals, an A/D (analog to digital) converter for converting each of the analog image signals into a digital image signal with a first bit number, and a white calibration area and a black calibration area for calibrating the scanning module. The transforming method comprises: (1) using the scanning module to scan the white and black calibration areas, (2) generating a plurality of white and black analog image signals through scanning of the white and black calibration areas by each sensor of the scanning module, and generating a plurality of corresponding white and black digital image signals by converting the white and black analog image signals generated by each sensor through use of the A/D converter, and (3) converting each digital image signal generated during scanning of the document by each sensor into a digital image signal with a second bit number according to the white and black digital image signals and a predetermined mapping method wherein the second bit number is greater than the first bit number.

3 Claims, 5 Drawing Sheets

| | W1 | W2 | W3 | W4 | B1 | B2 | B3 | B4 | B5 | B6 | B7 | B8 |
|---|---|---|---|---|---|---|---|---|---|---|---|---|
| Sensor 22 | 231 | 233 | 232 | 233 | 31 | 32 | 34 | 32 | 33 | 31 | 32 | 31 |
| Sensor 24 | 234 | 235 | 234 | 231 | 32 | 34 | 33 | 31 | 32 | 33 | 31 | 34 |

Fig. 2

| X | Y1 | Y2 | X | Y1 | Y2 | X | Y1 | Y2 |
|---|---|---|---|---|---|---|---|---|
| 0 | 0 | 0 | 33 | 327 | 163 | 66 | 11127 | 10923 |
| 1 | 0 | 0 | 34 | 655 | 489 | 67 | 11454 | 11249 |
| 2 | 0 | 0 | 35 | 982 | 815 | 68 | 11782 | 11575 |
| 3 | 0 | 0 | 36 | 1309 | 1141 | 69 | 12109 | 11901 |
| 4 | 0 | 0 | 37 | 1636 | 1467 | 70 | 12436 | 12227 |
| 5 | 0 | 0 | 38 | 1964 | 1793 | 71 | 12764 | 12553 |
| 6 | 0 | 0 | 39 | 2291 | 2119 | 72 | 13091 | 12879 |
| 7 | 0 | 0 | 40 | 2618 | 2445 | 73 | 13418 | 13205 |
| 8 | 0 | 0 | 41 | 2945 | 2771 | 74 | 13745 | 13531 |
| 9 | 0 | 0 | 42 | 3273 | 3097 | 75 | 14073 | 13857 |
| 10 | 0 | 0 | 43 | 3600 | 3424 | 76 | 14400 | 14183 |
| 11 | 0 | 0 | 44 | 3927 | 3750 | 77 | 14727 | 14509 |
| 12 | 0 | 0 | 45 | 4255 | 4076 | 78 | 15054 | 14835 |
| 13 | 0 | 0 | 46 | 4582 | 4402 | 79 | 15382 | 15161 |
| 14 | 0 | 0 | 47 | 4909 | 4728 | 80 | 15709 | 15487 |
| 15 | 0 | 0 | 48 | 5236 | 5054 | 81 | 16036 | 15813 |
| 16 | 0 | 0 | 49 | 5564 | 5380 | 82 | 16364 | 16139 |
| 17 | 0 | 0 | 50 | 5891 | 5706 | 83 | 16691 | 16466 |
| 18 | 0 | 0 | 51 | 6218 | 6032 | 84 | 17018 | 16792 |
| 19 | 0 | 0 | 52 | 6545 | 6358 | 85 | 17345 | 17118 |
| 20 | 0 | 0 | 53 | 6873 | 6684 | 86 | 17673 | 17444 |
| 21 | 0 | 0 | 54 | 7200 | 7010 | 87 | 18000 | 17770 |
| 22 | 0 | 0 | 55 | 7527 | 7336 | 88 | 18327 | 18096 |
| 23 | 0 | 0 | 56 | 7855 | 7662 | 89 | 18654 | 18422 |
| 24 | 0 | 0 | 57 | 8182 | 7988 | 90 | 18982 | 18748 |
| 25 | 0 | 0 | 58 | 8509 | 8314 | 91 | 19309 | 19074 |
| 26 | 0 | 0 | 59 | 8836 | 8640 | 92 | 19636 | 19400 |
| 27 | 0 | 0 | 60 | 9164 | 8966 | 93 | 19964 | 19726 |
| 28 | 0 | 0 | 61 | 9491 | 9292 | 94 | 20291 | 20052 |
| 29 | 0 | 0 | 62 | 9818 | 9618 | 95 | 20618 | 20378 |
| 30 | 0 | 0 | 63 | 10145 | 9945 | 96 | 20945 | 20704 |
| 31 | 0 | 0 | 64 | 10473 | 10271 | 97 | 21273 | 21030 |
| 32 | 0 | 0 | 65 | 10800 | 10597 | 98 | 21600 | 21356 |

Fig. 3

| X | Y1 | Y2 | X | Y1 | Y2 | X | Y1 | Y2 |
|---|----|----|---|----|----|---|----|----|
| 99 | 21927 | 21682 | 132 | 32727 | 32442 | 165 | 43527 | 43202 |
| 100 | 22254 | 22008 | 133 | 33054 | 32768 | 166 | 43854 | 43528 |
| 101 | 22582 | 22334 | 134 | 33382 | 33094 | 167 | 44182 | 43854 |
| 102 | 22909 | 22660 | 135 | 33709 | 33420 | 168 | 44509 | 44180 |
| 103 | 23236 | 22987 | 136 | 34036 | 33746 | 169 | 44836 | 44506 |
| 104 | 23564 | 23313 | 137 | 34363 | 34072 | 170 | 45163 | 44832 |
| 105 | 23891 | 23639 | 138 | 34691 | 34398 | 171 | 45491 | 45158 |
| 106 | 24218 | 23965 | 139 | 35018 | 34724 | 172 | 45818 | 45484 |
| 107 | 24545 | 24291 | 140 | 35345 | 35050 | 173 | 46145 | 45810 |
| 108 | 24873 | 24617 | 141 | 35673 | 35376 | 174 | 46472 | 46136 |
| 109 | 25200 | 24943 | 142 | 36000 | 35702 | 175 | 46800 | 46462 |
| 110 | 25527 | 25269 | 143 | 36327 | 36028 | 176 | 47127 | 46788 |
| 111 | 25854 | 25595 | 144 | 36654 | 36355 | 177 | 47454 | 47114 |
| 112 | 26182 | 25921 | 145 | 36982 | 36681 | 178 | 47782 | 47440 |
| 113 | 26509 | 26247 | 146 | 37309 | 37007 | 179 | 48109 | 47766 |
| 114 | 26836 | 26573 | 147 | 37636 | 37333 | 180 | 48436 | 48092 |
| 115 | 27163 | 26899 | 148 | 37963 | 37659 | 181 | 48763 | 48418 |
| 116 | 27491 | 27225 | 149 | 38291 | 37985 | 182 | 49091 | 48744 |
| 117 | 27818 | 27551 | 150 | 38618 | 38311 | 183 | 49418 | 49070 |
| 118 | 28145 | 27877 | 151 | 38945 | 38637 | 184 | 49745 | 49397 |
| 119 | 28473 | 28203 | 152 | 39273 | 38963 | 185 | 50072 | 49723 |
| 120 | 28800 | 28529 | 153 | 39600 | 39289 | 186 | 50400 | 50049 |
| 121 | 29127 | 28855 | 154 | 39927 | 39615 | 187 | 50727 | 50375 |
| 122 | 29454 | 29181 | 155 | 40254 | 39941 | 188 | 51054 | 50701 |
| 123 | 29782 | 29508 | 156 | 40582 | 40267 | 189 | 51382 | 51027 |
| 124 | 30109 | 29834 | 157 | 40909 | 40593 | 190 | 51709 | 51353 |
| 125 | 30436 | 30160 | 158 | 41236 | 40919 | 191 | 52036 | 51679 |
| 126 | 30763 | 30486 | 159 | 41563 | 41245 | 192 | 52363 | 52005 |
| 127 | 31091 | 30812 | 160 | 41891 | 41571 | 193 | 52691 | 52331 |
| 128 | 31418 | 31138 | 161 | 42218 | 41897 | 194 | 53018 | 52657 |
| 129 | 31745 | 31464 | 162 | 42545 | 42223 | 195 | 53345 | 52983 |
| 130 | 32073 | 31790 | 163 | 42872 | 42549 | 196 | 53672 | 53309 |
| 131 | 32400 | 32116 | 164 | 43200 | 42876 | 197 | 54000 | 53635 |

Fig. 4

| X | Y1 | Y2 | X | Y1 | Y2 |
|---|---|---|---|---|---|
| 198 | 54327 | 53961 | 231 | 65127 | 64721 |
| 199 | 54654 | 54287 | 232 | 65454 | 65047 |
| 200 | 54982 | 54613 | 233 | 65535 | 65373 |
| 201 | 55309 | 54939 | 234 | 65535 | 65535 |
| 202 | 55636 | 55265 | 235 | 65535 | 65535 |
| 203 | 55963 | 55591 | 236 | 65535 | 65535 |
| 204 | 56291 | 55918 | 237 | 65535 | 65535 |
| 205 | 56618 | 56244 | 238 | 65535 | 65535 |
| 206 | 56945 | 56570 | 239 | 65535 | 65535 |
| 207 | 57272 | 56896 | 240 | 65535 | 65535 |
| 208 | 57600 | 57222 | 241 | 65535 | 65535 |
| 209 | 57927 | 57548 | 242 | 65535 | 65535 |
| 210 | 58254 | 57874 | 243 | 65535 | 65535 |
| 211 | 58581 | 58200 | 244 | 65535 | 65535 |
| 212 | 58909 | 58526 | 245 | 65535 | 65535 |
| 213 | 59236 | 58852 | 246 | 65535 | 65535 |
| 214 | 59563 | 59178 | 247 | 65535 | 65535 |
| 215 | 59891 | 59504 | 248 | 65535 | 65535 |
| 216 | 60218 | 59830 | 249 | 65535 | 65535 |
| 217 | 60545 | 60156 | 250 | 65535 | 65535 |
| 218 | 60872 | 60482 | 251 | 65535 | 65535 |
| 219 | 61200 | 60808 | 252 | 65535 | 65535 |
| 220 | 61527 | 61134 | 253 | 65535 | 65535 |
| 221 | 61854 | 61460 | 254 | 65535 | 65535 |
| 222 | 62181 | 61786 | 255 | 65535 | 65535 |
| 223 | 62509 | 62112 | | | |
| 224 | 62836 | 62439 | | | |
| 225 | 63163 | 62765 | | | |
| 226 | 63491 | 63091 | | | |
| 227 | 63818 | 63417 | | | |
| 228 | 64145 | 63743 | | | |
| 229 | 64472 | 64069 | | | |
| 230 | 64800 | 64395 | | | |

Fig. 5

METHOD FOR INCREASING BIT NUMBER OF DIGITAL IMAGE SIGNALS GENERATED BY A SCANNER

BACKGROUND OF THE INVENTION

1. Field of the invention

The present invention relates to a scanner, and more particularly, to a method for increasing the bit number of digital image signals generated by a scanner.

2. Description of the Prior Art

A common scanner comprises a scanning module for scanning a document and generating a plurality of corresponding analog image signals, and an A/D (analog to digital) converter for converting each of the analog image signals into a digital image signal with a bit number. The greater the bit number of the digital image signals outputted from the scanner is, the finer the reconstructed images will be. The bit number of the digital image signals generated by the scanner is often limited by the capacity of the scanning module and the A/D converter. For example, if the scanning module of a scanner can only output digital image signals with A bits, then it can only obtain digital image signals of A bits when scanning a document. In order to generate finer reconstructed images with increased subtlety, the scanner has to be equipped with a scanning module with a greater bit number which obviously would cost more money.

SUMMARY OF THE INVENTION

It is therefore a primary objective of the present invention to provide a transforming method for increasing bit number of digital image signals generated by a scanner to solve the above mentioned problems.

In a preferred embodiment, the present invention provides a transforming method for increasing bit number of digital image signals generated by a scanner, the scanner comprising:

a scanning module having a plurality of linearly arranged sensors for scanning a document and generating a plurality of corresponding analog image signals;

an A/D (analog to digital) converter for converting each of the analog image signals into a digital image signal with a first bit number; and a white calibration area and a black calibration area for calibrating the scanning module;

the transforming method comprising:

(1) using the scanning module to scan the white and black calibration areas;

(2) generating a plurality of white and black analog image signals through scanning of the white and black calibration areas by each sensor of the scanning module, and generating a plurality of corresponding white and black digital image signals by converting the white and black analog image signals generated by each sensor through use of the A/D converter; and (3) converting each digital image signal generated during scanning of the document by each sensor into a digital image signal with a second bit number according to the white and black digital image signals and a predetermined mapping method wherein the second bit number is greater than the first bit number.

It is an advantage of the present invention that finer and more colorful images are obtained through increasing bit number of digital image signals without increasing the cost of the scanner.

This and other objectives of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 2 lists calibration values generated by sensors of the scanning module of the scanner in FIG. 1.

FIGS. 3 to 5 list 8-bit digital image signals with corresponding 16-bit digital image signals of the sensors in FIG. 1.

DETAILED DESCRIPTION OF THE PREFERRED EMBODIMENT

Figure 1:
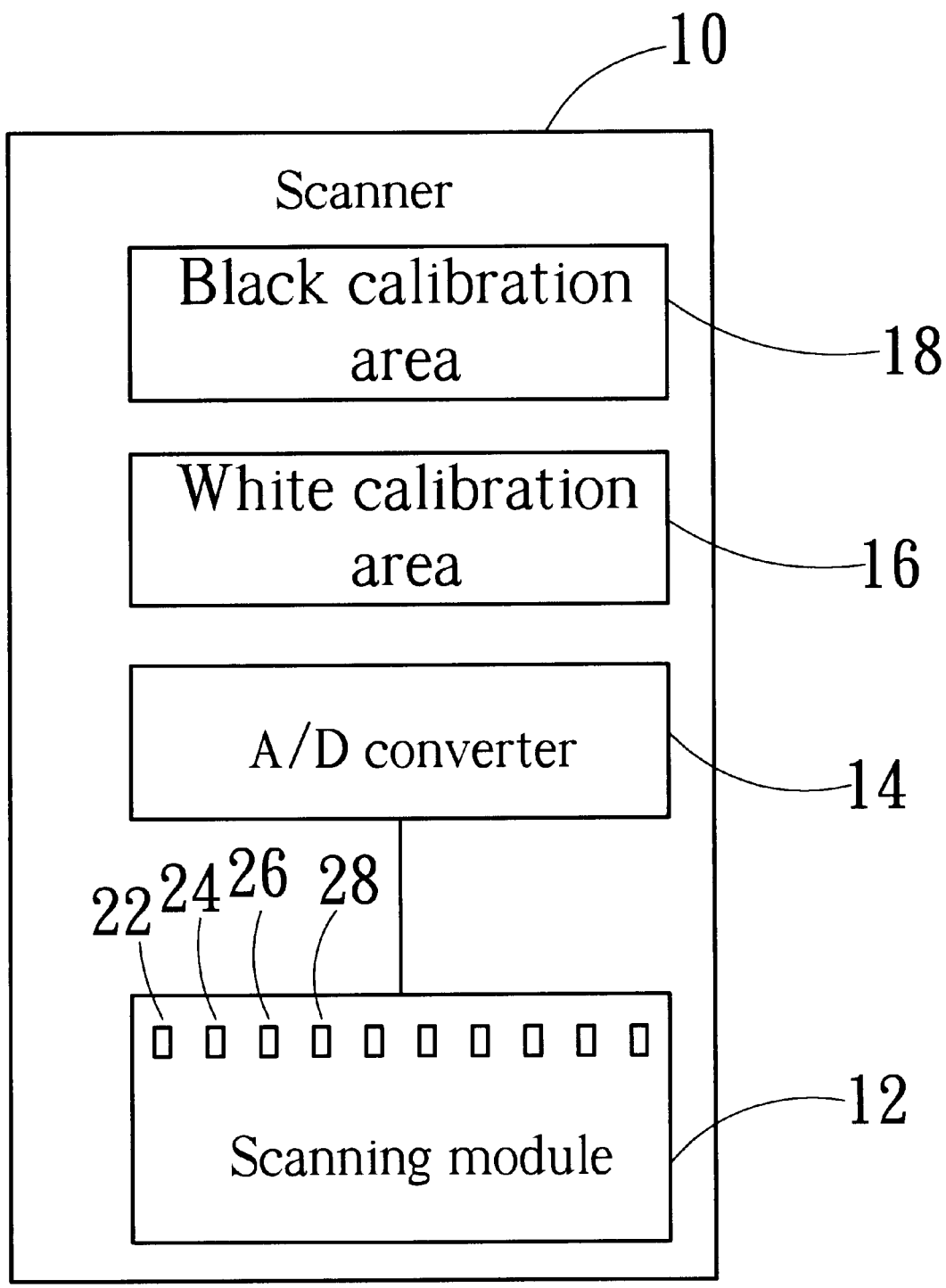
FIG. 1 is a block diagram of a scanner according to the present invention.

Please refer to FIG. 1. FIG. 1 is a block diagram of a scanner 10 according to the present invention. The following example illustrates using a transforming method of the present invention on the scanner 10 to transform 8-bit digital image signals (the range of values is 0 to 255) into 16-bit digital image signals (the values are between 0 to 65535).

The scanner 10 comprises a scanning module 12 for scanning a document and generating a plurality of corresponding analog image signals, an A/D (analog to digital) converter 14 for converting each of the analog image signals into a digital image signal with a bit number of eight, a white calibration area 16, and a black calibration area 18. The scanning module 12 comprises a plurality of linearly arranged sensors 22, 24, 26, 28. Before scanning a document, the scanning module 12 first scans the white calibration area 16 and the black calibration area 18 through use of each sensor of the scanning module 12 to generate a plurality of white and black analog image signals. Then, the A/D converter 14 will convert the white and black analog image signals generated by each sensor to generate a plurality of corresponding 8-bit white and black digital image signals. Finally, digital image signals generated during scanning of the document by each of the sensors are converted into 16-bit digital image signals according to the white and black 8-bit digital image signals and a predetermined mapping method.

Please refer to FIG. 2. FIG. 2 lists calibration values generated by the sensors 22, 24. The sensors 22,24 first scan the white calibration area 16 and separately take samples from four scanning lines W1, W2, W3, W4 to generate analog image signals, and the A/D converter 14 converts the analog image signals to generate two groups of 8-bit digital image signals (231,233,232,233) and (234,235,234,231). Then the sensors 22, 24 scan the black calibration area is and separately take samples from eight scanning lines B1, B2, B3, B4, B5, B6, B7, B8 to generate analog image signals, and the A/D converter 14 converts the analog image signals to generate two groups of 8-bit digital image signals (31, 32,34,32,33,31,32,31) and (32,34,33,31,32,33,31,34).

After each sensor takes samples from the white calibration area 16 and the black calibration area 18, transformation of 8-bit digital image signals in bit number is performed. The following description uses the sensor 22 as an example to illustrate transformation steps and transforming formulas:

(a) adding up the group of 8-bit digital image signals obtained from the white calibration area 16 (231,233, 232,233) and obtaining the average $\overline{W}$ by:

$$\overline{W} = \frac{1}{4}\sum_{i=1}^{4} Wi = \frac{1}{4}(231+233+232+233) = \frac{1}{4}*929 = 232.25,$$

(b) adding up the group of 8-bit digital image signals obtained from black calibration area 18 (31,32,34,32,33,31,32,31) and obtaining the average $\overline{B}$ by:

$$\overline{B} = \frac{1}{8}\sum_{i=1}^{8} Bi = \frac{1}{8}(31+32+34+32+33+31+32+31) = \frac{1}{8}*256 = 32,$$

(c) assuming an 8-bit digital image signal acquired from scanning a document by the sensor 22 can be depicted as X, a real transformed value R1 can be obtained by using the value of X in the following transforming formula:

$$R1 = \frac{X - \overline{B}}{\overline{W} - \overline{B}} = \frac{X - 32}{232.25 - 32} = \frac{X - 32}{200.25},$$

(d) this real transformed value R1 is then multiplied by $2^{16}(=65536)$ then rounded to a nearest integer to obtain a 16-bit digital image signal Y1.

If the 8-bit digital image signal X obtained by scanning the document through the sensor 22 is smaller than the average $\overline{B}$, the real transformed value R1 will be negative. In this case, the transformed value of the 16-bit digital image signal is set to 0. Likewise, if the transformed 16-bit digital image signal is greater than $2^{16}-1(=65535)$, then it is set to 65535.

Applying the same steps (a) to (c) to the sensor 24, $\overline{W}$=233.5 and $\overline{B}$=32.5, so for the sensor 24 the following transforming formula is obtained:

$$R2 = \frac{X - \overline{B}}{\overline{W} - \overline{B}} = \frac{X - 32.5}{233.5 - 32.5} = \frac{X - 32.5}{201},$$

this real transformed value R2 is multiplied by $2^{16}(=65536)$ and then rounded to a nearest integer to obtain a 16-bit digital image signal Y2.

If the number of samples taken by each sensor 22, 24 is a power of 2 such that the number of samples taken in the white calibration area 16 is $2^m$ where m is an integer and the number of samples taken in the black calibration area 18 is $2^n$ where n is an integer. And each of the white digital image signals can be depicted as $Wi(i=1\sim 2^m)$; each of the black digital image signals can be depicted as $Bi(i=1\sim 2^n)$. The following transforming formula can be obtained:

$$R'1 = \frac{X - \overline{B}}{\overline{W} - \overline{B}} = \frac{X - \frac{\sum_{i=1}^{2^n} Bi}{2^n}}{\frac{\sum_{i=1}^{2^m} Wi}{2^m} - \frac{\sum_{i=1}^{2^n} Bi}{2^n}} = \frac{X - \frac{Bs}{2^n}}{\frac{Ws}{2^m} - \frac{Bs}{2^n}} = \frac{2^{m+n}*X - 2^m*Bs}{2^n*Ws - 2^m*Bs},$$

where $Ws = \sum_{i=1}^{2^m} Wi,\ Bs = \sum_{i=1}^{2^n} Bi;$

Taking the sensor 22 as an example, the steps (a) to (d) mentioned above can be changed to the following steps (e) to (h):

(e) adding up the group of 8-bit digital image signals (231,233,232,233) acquired from the white calibration area 16 to obtain the sum, Ws, as follows:

$$Ws = \sum_{i=1}^{2^2} Wi = 231 + 233 + 232 + 233 = 929,$$

(f) adding up the group of 8-bit digital image signals (31,32,34,32,33,31,32,31) acquired from the black calibration area 18 to obtain the sum, Bs, as follows:

$$Bs = \sum_{i=1}^{2^3} Bi = 31+32+34+32+33+31+32+31 = 256,$$

(g) assuming the 8-bit digital image signals acquired from scanning a document by sensor 22 can be depicted as X, then a transforming value R'1 can be depicted as the following transforming formula in terms of X:

$$R'1 = \frac{X - \overline{B}}{\overline{W} - \overline{B}} = \frac{2^{m+n}*X - 2^m*Bs}{2^n*Ws - 2^m*Bs} = \frac{2^{2+3}*X - 2^2*256}{2^3*929 - 2^2*256} = \frac{4X - 128}{801},$$

(h) multiplying this real transformed value R'1 by $2^{16}(=65536)$ while using the value of X and rounded to the nearest integer to obtain the 16-bit digital image signal Y'1.

In this method, integral division is performed at step (h) to prevent possible accumulation of deviation if division were to occur at an earlier step. Following the above transforming steps and formulas, the 8-bit digital image signal X generated by the sensor 22 can be transformed into the 16-bit digital image signal Y'1, and by the same manner the 8-bit digital image signals generated by the sensors 24, 26, 28 can also be transformed in to 16-bit digital image signals Y'2, Y'3, Y'4.

Please refer to FIGS. 3 to 5. FIGS. 3 to 5 list 8-bit digital image signals with corresponding 16-bit digital image signals of the sensors 22, 24. Transformation of the 8-bit digital image signals of the different sensors 22, 24 are performed according to the following corresponding transforming formulas:

The first column of FIG. 3 refers to the possible values of X which ranges from 0 to 255 for a total of 256 different values. The second column refers to 16-bit digit image signals transformed from 8-bit digital image signals generated by the sensor 22. Because 8-bit digital image signals less than 33 are mapped to 0 and those greater than 232 are mapped to 65535, there are only 203 different Y1 values. The third column refers to 16-bit digit image signals transformed from 8-bit digital image signals generated by the sensor 24. Because 8-bit digital image signals less than 33 are mapped to 0 and those greater than 233 are mapped to 65535, there are only 204 different Y2 values. As shown in FIG. 3, except for the two extreme values of 0 and 65535, Y1, Y2 have the same value only at (X, Y2)=(166, 43854) and (X, Y1)=(167, 43854). This is to say, when there are just two sensors 22, 24, 203+204−3=404 values can be transformed from 256 different input values. However, the number of transformed values will increase with the number of sensors. Thus by using the transforming method of the present invention, the bit number of output image signals can be increased and output screen images will become finer and more colorful.

Compared with the prior art, each of the sensors 22, 24, 26, 28 is used to scan a white calibration area and a black calibration area to take samples, and then each digital image signal generated during scanning of the document by each sensor is converted into a digital image signal with a greater bit number according to the samples taken and a predetermined mapping method. The present invention does not require replacement of any hardware to increase the bit number of the digital image signals. Therefore, finer and more colorful images can be obtained without increasing the cost of the scanner 10.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A transforming method for increasing bit number of digital image signals generated by a scanner, the scanner comprising:

a scanning module having a plurality of linearly arranged sensors for scanning a document and generating a plurality of corresponding analog image signals;

an A/D (analog to digital) converter for converting each of the analog image signals into a digital image signal with a first bit number; and a white calibration area and a black calibration area for calibrating the scanning module;

the transforming method comprising;

(1) using the scanning module to scan the white and black calibration areas;

(2) generating a plurality of white and black analog image signals through scanning of the white and black calibration areas by each sensor of the scanning module, and generating a plurality of corresponding white and black digital image signals by converting the white and black analog image signals generated by each sensor through use of the A/D converter: and (3) converting each digital image signal generated during scanning of the document by each sensor into a digital image signal with a second bit number according to the white and black digital image signals and a predetermined mapping method wherein the second bit number is greater than the first bit number;

wherein the number of white digital image signals generated by each sensor is $2^m$ and can be depicted as Wi ($i=1 \sim 2^m$), where m is an integer, and the number of black digital image signals of each sensor is $2^n$ and can be depicted as Bi ($i=1 \sim 2^n$), where n is an integer, and the mapping method comprises the following steps:

(1) adding up all the white digital image signals of each sensor and depicting the sum as Ws wherein $$Ws = \sum_{i=1}^{2^m} Wi,$$

(2) adding up all the black digital image signals of each sensor and depicting the sum as Bs wherein $$Bs = \sum_{i=1}^{2^n} Bi,$$

(3) converting each digital image signal (X) generated by the sensor when scanning the document into a transformed real number (R) by the following formula:

$$R = \frac{2^{m+n} * X - 2^m * Bs}{2^n * Ws - 2^m * Bs}, \quad \text{and}$$

(4) transforming the real number into a digital image signal with the second bit number.

2. The transforming method of claim 1 wherein the mapping method first uses a real number division to obtain a white-average real number of each sensor from the plurality of white digital image signals generated by the sensor and a black-average real number of each sensor from the plurality of black digital image signals generated by the sensor, then transforms each digital image signal generated through scanning the document by each sensor into a transformed real number according to the white-average real number and black-average real number of the sensor, and converts the transformed real number into a digital image signal with the second bit number.

3. The transforming method of claim 2 wherein the plurality of white and black digital image signals of each sensor can be depicted as Wi($i=1 \sim m$) and Bi($i=1 \sim n$), and the white-average real number ($\overline{W}$) and black-average real number ($\overline{B}$) of each sensor can be derived from the following two formulas:

$$\overline{W} = \frac{1}{m}\sum_{i=1}^{m} Wi$$

$$\overline{B} = \frac{1}{n}\sum_{i=1}^{n} Bi$$

and each digital image signal (X) generated by each sensor when scanning the document can be transformed into a transformed real number (R) mentioned above according to the following formula:

$$R = \frac{X - \overline{B}}{\overline{W} - \overline{B}}.$$

* * * * *